United States Patent
Zaremba

(10) Patent No.: US 12,158,264 B2
(45) Date of Patent: Dec. 3, 2024

(54) OPTICAL COMPONENT FOR A LUMINAIRE

(71) Applicant: SIGNIFY HOLDING B.V., Eindhoven (NL)

(72) Inventor: Krzysztof Cezary Zaremba, Bialystok (PL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/281,659

(22) PCT Filed: Mar. 4, 2022

(86) PCT No.: PCT/EP2022/055517
§ 371 (c)(1),
(2) Date: Sep. 12, 2023

(87) PCT Pub. No.: WO2022/194568
PCT Pub. Date: Sep. 22, 2022

(65) Prior Publication Data
US 2024/0302024 A1   Sep. 12, 2024

(30) Foreign Application Priority Data
Mar. 18, 2021   (EP) .................................... 21163370

(51) Int. Cl.
*F21V 5/00*   (2018.01)
*F21S 8/06*   (2006.01)
*F21V 3/04*   (2018.01)
*F21V 11/06*   (2006.01)
*F21V 13/10*   (2006.01)
*F21Y 115/10*  (2016.01)

(52) U.S. Cl.
CPC ................ *F21V 5/007* (2013.01); *F21S 8/06* (2013.01); *F21V 3/049* (2013.01); *F21V 11/06* (2013.01); *F21V 13/10* (2013.01); *F21Y 2115/10* (2016.08)

(58) Field of Classification Search
CPC .................. F21S 8/04–06; F21V 5/007; F21V 11/06–065; F21V 13/10; F21Y 2115/10
See application file for complete search history.

(56) References Cited

U.S. PATENT DOCUMENTS 3,265,887 A    8/1966   Wince
2012/0320585 A1  12/2012  Lin et al.

FOREIGN PATENT DOCUMENTS

| CN | 208764733 U | 4/2019 |
| EP | 2966346 A1 | 1/2016 |
| EP | 3696591 A1 | 8/2020 |
| WO | 2019215265 A1 | 11/2019 |

*Primary Examiner* — Jason M Han

(57) ABSTRACT

The invention relates to an optical component (140) for a luminaire (100). The optical component (140) comprises a carrier plate (141) having an upper surface (141a) and a lower surface (141b), and a plurality of lens elements (142) provided on the upper surface (141a). Each two neighboring lens elements (142) has an intermediate region (143). In each intermediate region (143), the carrier plate (141) comprises a slit (144) having an elongated shape with an axis of elongation parallel to a plane of the carrier plate (141). The optical component (140) can be used in a luminaire (100) to meet the office requirements regarding glare, in particular the L65 requirement.

10 Claims, 6 Drawing Sheets

OPTICAL COMPONENT FOR A LUMINAIRE

CROSS-REFERENCE TO PRIOR APPLICATIONS

This application is the U.S. National Phase application under 35 U.S.C. § 371 of International Application No. PCT/EP2022/055517, filed on Mar. 4, 2022, which claims the benefit of European Patent Application No. 21163370.6, filed on Mar. 18, 2021. These applications are hereby incorporated by reference herein.

FIELD OF THE INVENTION

The present invention relates to an optical component for a luminaire, such as an LED (light emitting diode) luminaire. The present invention also relates to a luminaire comprising such an optical component.

BACKGROUND OF THE INVENTION

Luminaires, particularly those for use in an office environment, have to meet certain requirements relating to glare. According to the International Commission on Illumination (CIE), glare is defined as "visual conditions in which there is excessive contrast or an inappropriate distribution of light sources that disturbs the observer or limits the ability to distinguish details and objects."

The glare within a visual field of view can be measured with a luminance meter. This is a device used in photometry for measuring the luminous intensity per unit area of light travelling in a given direction (i.e., the luminance) within a particular solid angle. The glare can be calculated from the measured luminance data.

The CIE recommends the Unified Glare Rating (UGR) as a quantitative measure of glare. The UGR is calculated by using an equation that takes into account a number of factors that may contribute to glare caused by a luminaire, such as the luminance of the luminaire, the value of the background luminance, the solid angle of the luminaire that is seen by a viewer, and the likelihood of glare as expressed by the Guth position index (which is sometimes also referred to as the visual comfort probability).

For a luminaire to be fully office-compliant, a first requirement is that the UGR should not be more than 19. A second requirement is that the luminance at an angle of 65 degrees above the nadir (L65), and also the luminance at higher angles, should not be more than 3000 cd/m$^2$. Preferably, meeting these requirements should not go at the expense of efficiency.

A first example of a luminaire that meets the aforementioned requirements regarding glare has a board with a plurality of light sources (such as LEDs), a diffuser that is arranged to receive light that is emitted by the plurality of light sources, and a micro-lens optical (MLO) plate. The purpose of the diffuser is to make the individual light sources less visible, and the purpose of the MLO plate is to prevent light beams from exiting the luminaire at relatively shallow angles. In operation, the luminaire provides a relatively uniform and collimated light output. However, the overall efficiency is typically below 70% and the MLO plate is relatively expensive.

A second example of a luminaire that meets the aforementioned requirements regarding glare has a board with a plurality of light sources (such as LEDs), an optical component in the form of a lens plate with a plurality of lens elements, for receiving light that is emitted by the plurality of light sources, and a diffuser (such as a frosted cover). The combination of a lens plate and a diffuser typically results in an overall efficiency above 80%.

SUMMARY OF THE INVENTION

It was found that, for a luminaire with a combination of a diffuser and an MLO plate but also for a luminaire with a combination of a lens plate and a diffuser, it is still difficult to meet the L65 requirement.

It is an object of the present invention to overcome or at least alleviate the above-mentioned problem, and to provide an improved optical component.

According to a first aspect of the invention, this and other objects are achieved by an optical component for a luminaire, the optical component comprising a carrier plate having an upper surface and a lower surface, and a plurality of lens elements provided on the upper surface, each two neighboring lens elements having an intermediate region, wherein, in each intermediate region, the carrier plate comprises a slit, the slit having an elongated shape with an axis of elongation parallel to a plane of the carrier plate.

The object of the invention is achieved by the optical component according to the first aspect of the invention, through the provision of slits between the lens elements. Without wishing to be bound to a theory, it is believed that the difficulty in meeting the L65 requirement is caused by light guiding within the optical component, in particular within the carrier plate of the optical component. The slits between the lens elements serve to reduce any undesired light guiding within the optical component. The slits mainly reduce luminous flux at relatively wide angles to the nadir, and they have hardly any influence on the total efficiency of the luminaire. As will be shown hereinafter, optical simulations indicate that the L65 is reduced by at least 10%.

Each slit may fully extend through the carrier plate, from the upper surface to the lower surface.

Each slit has a cross section in a plane perpendicular to the axis of elongation. The cross section may have a rectangular shape, or it may be shaped as an isosceles trapezoid. In the latter case, the cross section has a shape with two opposing tapering sides. A slit with such a cross section may also be referred to as a V-groove. The two opposing tapering sides have an enclosed angle. The enclosed angle may have any value, such as 10 degrees, 20 degrees or 60 degrees. Larger angles, such as 60 degrees (or more), may be advantageous compared to smaller angles, such as 10 degrees (or less), because less flux is passing through the slit due to more rays being reflected through total internal reflection.

In case the slits have a cross section with two opposing tapering sides, each of the two opposing tapering sides may have a stepped surface profile. In case there is sufficient space in between the lens elements, optical simulations have shown that it is preferred to have slits in the form of a V-groove with a stepped surface profile.

The optical component may further comprise a plurality of louvers, and each louver may be provided in a slit. The slits then have a further advantage in that they easily allow the provision of louvers within the slits. The presence of louvers is beneficial for meeting the office requirements. The louvers may be interconnected to form a louver grid.

For each two neighboring lens elements, the intermediate region has a first width, and the slit has a second width, each of the first width and the second width being measured in a direction connecting the centers of the two neighboring lens elements. The second width (i.e. the width of the slit) may be larger than the first width (i.e. the width of the intermediate region) so that the slit (intentionally) cuts a part of each of the two neighboring lens elements. This makes the light distribution slightly narrower in the C90 plane.

According to a second aspect of the invention, the object is achieved by a luminaire comprising a light engine having a board with a plurality of light sources, and an optical component according to the first aspect of the invention, wherein the optical component is arranged to receive light that is emitted by the light engine.

The light engine and the optical component may be provided in a housing. The housing may have a light exit window, and the luminaire may further have a light transmissive cover that is arranged at the light exit window.

The light transmissive cover may be a diffusive cover or a clear cover, such as a transparent cover.

The optical component may be attached to the light engine by means of a click connection.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Figure 1:
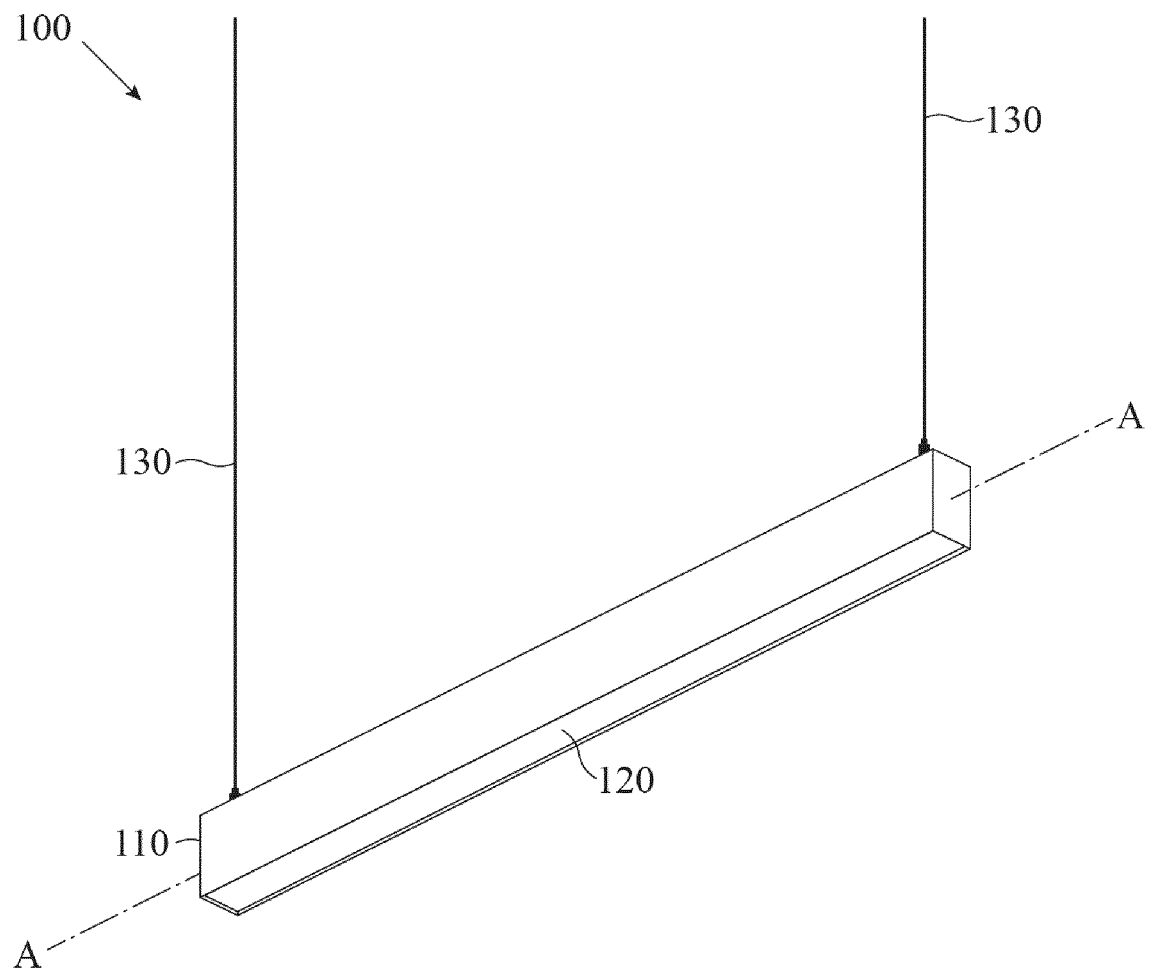
FIG. 1 shows a luminaire.

FIG. 1 shows a luminaire 100 having a housing 110 that extends along an axis A. The luminaire 100 can be suspended from a ceiling by means of suspension cables 130. The housing 110 of the luminaire 100 has a light exit window wherein a light transmissive cover 120 is provided. The light transmissive cover 120 may be a diffusive cover, such as a frosted cover. Alternatively, the light transmissive cover 120 may be a clear cover, such as a transparent cover.

Figure 2:
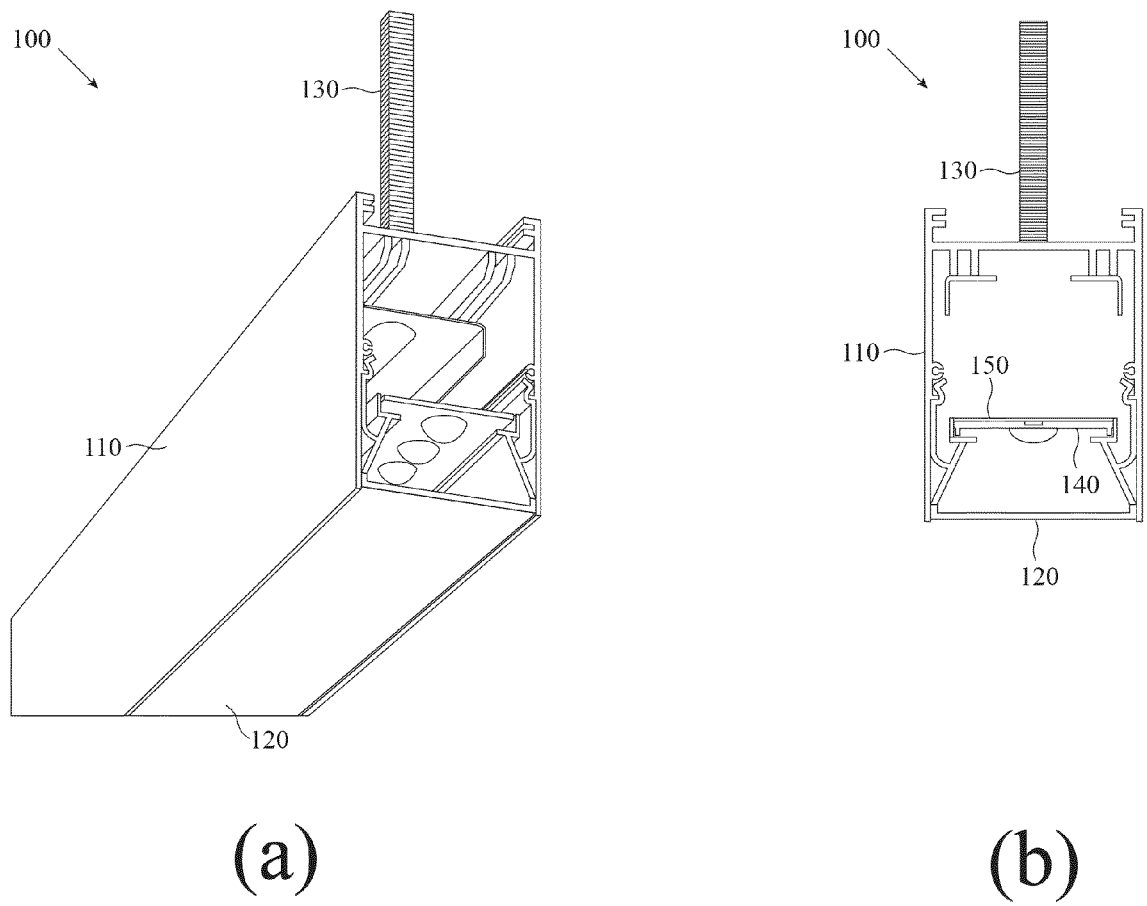
FIGS. 2a and 2b show a close-up and a cross sectional view, respectively, of the luminaire of FIG. 1.

FIG. 2a shows the same luminaire 100, but now with an end cap being removed to allow a view inside the housing 110.

FIG. 2b shows a cross section of the luminaire 100, perpendicular to the axis A. The cross sectional view also shows the presence, within the housing 110, of an optical component 140 and a light engine 150. In operation, the optical component 140 receives light that is emitted by the light engine 150. The light then leaves the luminaire 100 via the light exit window of the housing 110 and through the light transmissive cover 120.

Figure 3:
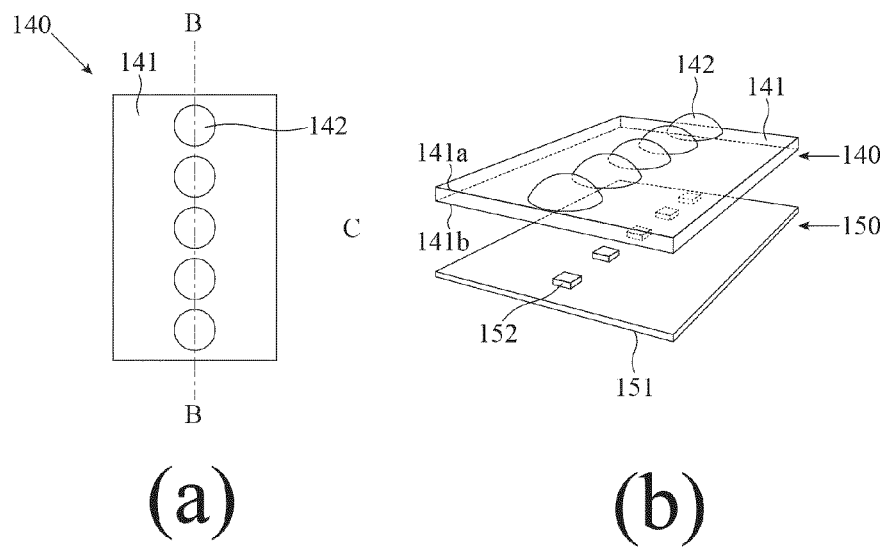
FIGS. 3a and 3b show a top view and an exploded perspective view of an optical component and a light engine.

FIG. 3a shows a top view of the optical component 140. The optical component 140 has a carrier plate 141 and a plurality of lens elements 142, arranged in a linear array on the carrier plate 141. The linear array is oriented along an axis B of the optical component 140. The carrier plate 141 and the lens elements 142 may be integral parts of a one-piece (or monolithic) optical component 140.

FIG. 3b shows an exploded perspective view of the optical component 140, indicating that the lens elements 142 are provided on an upper surface 141a of the carrier plate 141. Opposite the upper surface 141a, the carrier plate 141 has a lower surface 141b. The lower surface 141b faces the light engine 150. The light engine 150 comprises a board 151 with light sources 152. When viewed in a direction from the light engine 150 to the optical component 140, each light source 152 is aligned with a lens element 142.

In operation, the optical component 140 receives light that is emitted by the light engine 150. The emitted light is first incident on the lower surface 141b, where it can be refracted or reflected. The refracted light enters the optical component 140. The reflected light can also enter the optical component 140, for example after being reflected back towards the lower surface 141b by the light engine 150. The light that has entered the optical component 140 can leave the optical component 140 via refraction at the upper surface 141a or at the lens elements 142. The light can also be guided within the optical component 140 by means of total internal reflection. This fraction of the light (i.e. the fraction of the light emitted by the light sources that, after entering the optical component 140, travels a certain distance within the optical component 140) can leave the optical component 140 under relatively high angles with respect to the normal of the upper surface 141a, which in turn would result in a value for the luminance at angles of 65 degrees above the nadir that does not meet the office requirements.

In FIG. 3b, the lens elements 142 are convex lenses and the light sources 152 are LEDs. The optical component 140 may be attached to the light engine 150 by means of a click connection. In other words, the optical component 140 may be a click-on component.

The carrier plate 141 and the lens elements 142 of the optical component 140 may be made from poly(methyl methacrylate) (PMMA) or from polycarbonate (PC). When the optical component is a click-on component, PC is preferred over PMMA. This is because PMMA is a relatively brittle material, and compared to PMMA, PC has a better mechanical reliability. The advantage of the optical component being a click-on component is that it allows a simplified construction. A further advantage of using PC instead of PMMA is that PC has a lower flammability than PMMA.

PMMA has a refractive index of 1.492 and PC has a refractive index of 1.596. Because the refractive index of PC is higher than that of PMMA, the shape of PC lens elements has to be adjusted compared to the shape of PMMA lens elements to maintain a similar light distribution. The shape of the lens elements is determined by the internal and external surfaces of the lens elements. Fresnel reflections from a PC surface amount to about 5% and Fresnel reflections from a PMMA surface amount to about 4%. Because it is difficult to control the luminous flux from such Fresnel reflections, PC lens elements will typically have an L65 value that is about 25% higher than PMMA lens elements of a similar shape.

Simulations have shown that the increased L65 value is caused by light rays from a light source that undergo Fresnel reflections before subsequently passing through lens elements that are located further away from the light source.

Providing louvers in between neighboring lens elements helps to reduce the L65 value. For example, when louvers with a height of 1.5 millimeters and a reflectance of 5% are used in combination with PC lens elements, the L65 value is reduced from 3512 cd/m$^2$ to 2735 cd/m$^2$, which would meet the office requirement of having an L65 value of 3000 cd/m$^2$ or less. The louvers can be provided in the form of a louver grid. However, this may not be preferred from a mechanical point of view because such a louver grid is relatively flexible, and because the positioning and assembly is relatively difficult. When the louvers are made thicker and/or higher, the efficacy and the width of the light distribution are reduced, and visual artefacts are to be expected.

The inventor has found that the desired reduction of the L65 value to a value that falls within the range as required for office compliancy can also be obtained by providing slits in each intermediate region between two neighboring lens elements.

Figure 4:
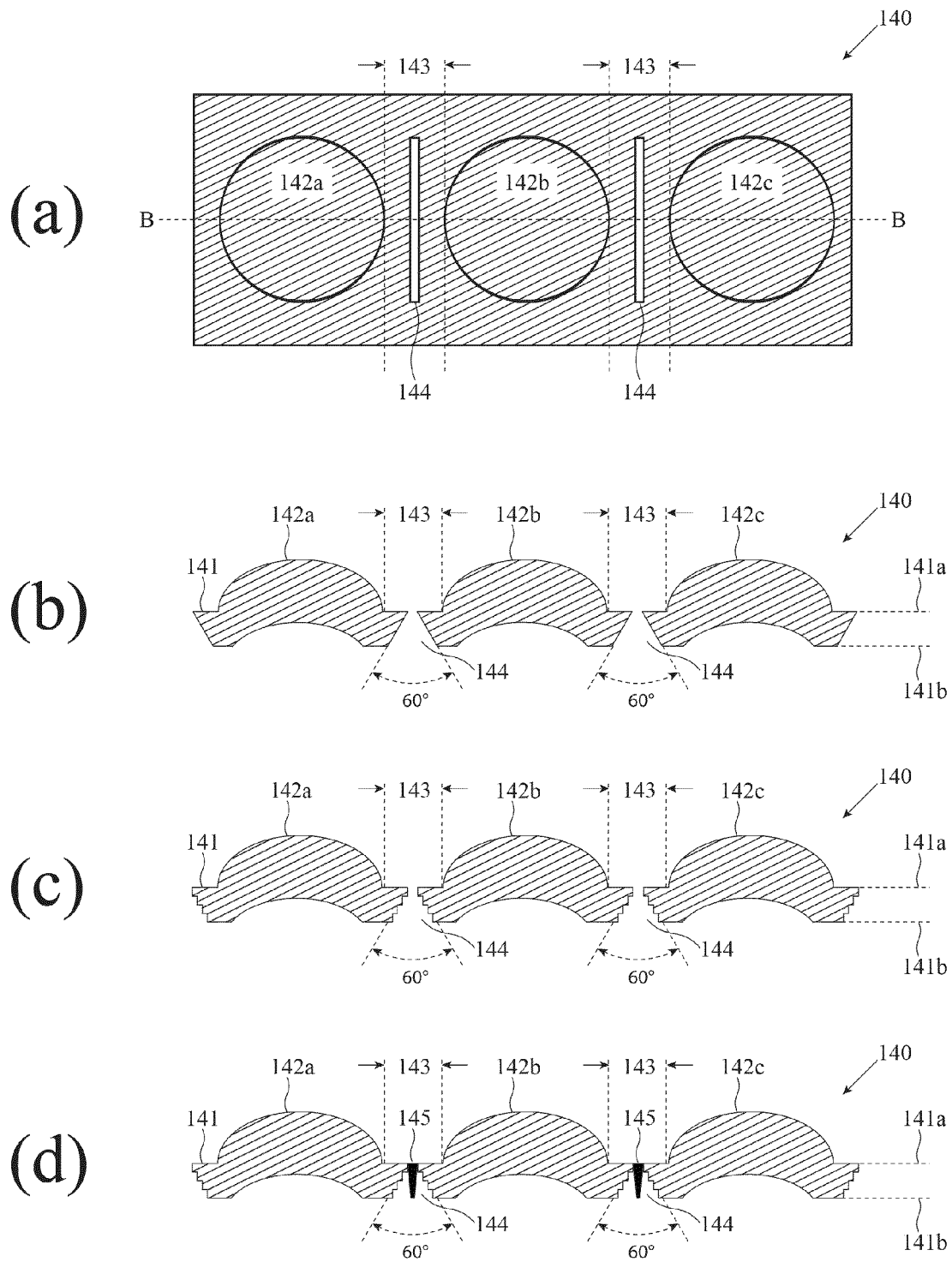
FIGS. 4a to 4d show a top view and alternative cross sectional views of optical components.

FIG. 4a shows a top view of part of an optical component 140. The optical component 140 has three lens elements 142a, 142b and 142c. Between neighboring lens elements 142a and 142b, and between neighboring lens elements 142b and 142c, is an intermediate region 143. Each intermediate region 143 comprises a slit 144. Each slit 144 has an elongated shape with an axis of elongation. An elongated shape refers to a shape with a length and a width, wherein the aspect ratio of the length and width is at least 2, such as at least 5 or at least 10. The axis of elongation is oriented in a direction parallel to a plane of the carrier plate 141 and perpendicular to a line B that interconnects the centers of the two neighboring lens elements.

FIG. 4b shows a cross sectional side view of the optical component 140. In this view it can be seen that each slit 144 has a cross section in a plane perpendicular to the axis of elongation, wherein the cross section has a shape with two opposing sides that taper from the lower surface 141b of the carrier plate 141 to the upper surface 141a of the carrier plate 141. Furthermore, the two opposing tapering sides have an enclosed angle of about 60 degrees. Each slit 144 fully extends through the carrier plate 141, from the upper surface 141a to the lower surface 141b. In other words, each slit 144 is a through hole. At the lower surface 141b, the carrier plate 141 has cavities or recesses, each for accommodating a light source.

FIG. 4c shows an alternative cross sectional side view of the optical component 140. Now, for each slit 144, each of the two opposing tapering sides has a stepped surface profile.

FIG. 4d again shows the cross sectional side view of FIG. 4c, but now the optical component 140 further comprises a plurality of louvers 145. Each louver 145 is provided in a slit 144 and may have a reflectance of 5% (or less).

The stepped surface profiles illustrated in FIGS. 4c and 4d further help to reduce any undesired light guiding in the carrier plate of the optical component 140 in order to meet the L65 requirement. By means of optical simulations, a decrease of about 10% of the L65 value has been found.

Furthermore, the stepped surface profile may serve as a mounting means for a louver 145. It is noted that louvers may also be provided in slits of a different shape, but slits in the form of tapered grooves with a stepped surface profile allow the louvers to be provided in a convenient manner. Providing louvers within the slits further helps to meet the L65 requirement. By means of optical simulations, a further decrease of about 30% of the L65 value has been found. The combination of slits with stepped surface profiles and louvers provided within gives a total reduction of about 40% of the L65 value.

Figure 5:
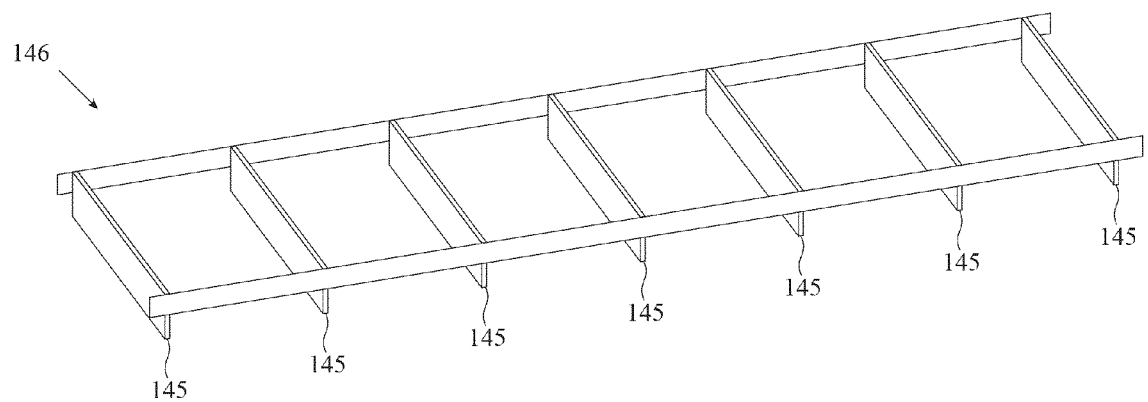
FIG. 5 shows a perspective view of a louver grid.

The plurality of louvers 145 may be interconnected to form a louver grid 146, as illustrated in FIG. 5. Because the louvers 145 are accommodated by the slits 144, a louver grid 146 can be easily mounted onto the optical component 140.

The slits 144 illustrated in FIGS. 4b to 4d have a cross section with a tapered shape, but other shapes may also be used. The slits 144 illustrated in FIGS. 4b to 4d fully extend through the carrier plate 141. In other words, the slits 144 are through holes. Alternatively, the slits may also only partly extend through the carrier plate, from the lower surface towards the upper surface, or vice versa. In this case, the slits are blind holes.

The function of the slits is to reduce the flux of light that is transported along the carrier plate. This function is achieved by frustrating light guiding through total internal reflection within the carrier plate. For this purpose, each slit has a cross section in a plane perpendicular to the axis of elongation. The cross section has a width and a depth, and it may have any shape. The ratio of the width and depth defines an aspect ratio of the slit. For achieving the effect of reducing the flux of light that is transported along the carrier plate, the aspect ratio may have any value. From a manufacturing point of view, certain aspect ratios may be preferred. For example, if the optical component is to be manufactured by means of a molding process, certain constraints on the aspect ratio of the slits may apply.

Figure 6:
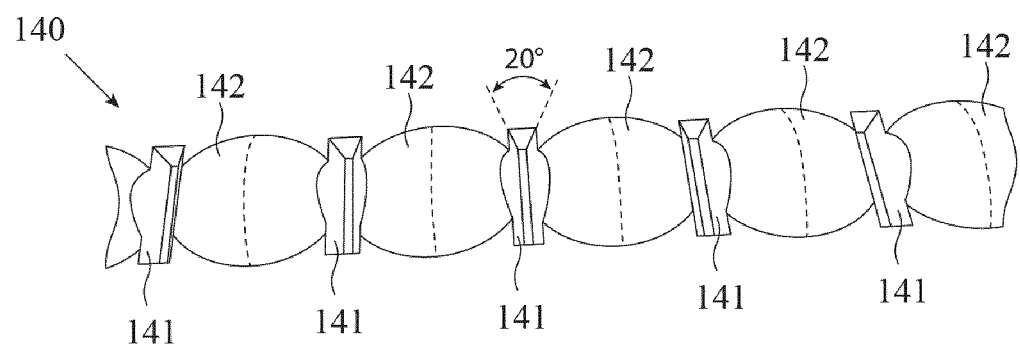
FIG. 6 shows a perspective view of an optical component. The schematic drawings are not necessarily to scale.

When the packing of the lens elements on the carrier plate is relatively dense, the intermediate regions between neighboring lens elements will be relatively narrow, as will the available space for providing slits in these intermediate regions. In such a situation, the width of the slits may be higher than the width of the intermediate regions (the width being the dimension measured in a direction connecting the centers of the lens elements immediately adjacent to the intermediate region and the slit). This means that each slits intentionally cuts a part of each of the two neighboring lens elements. This has the effect that the light distribution in the C90 plane will be narrowed. Such a configuration is illustrated in FIG. 6, showing a perspective top view of an optical component 140. The lens elements 142 are so densely packed that the widths of the intermediate regions are close to zero. The slits 144 extend from the upper surface, on which the lens elements 142 are provided, to the lower surface. The widths of the slits 144 are higher than the widths of the intermediate regions between neighboring lens elements 142, and each slit 144 cuts a part of each of the two neighboring lens elements 142. It is noted that the dashed lines that are drawn in the lens elements 142 are merely to visualize a (convex) curvature of an outer surface of the lens elements 142.

In FIG. 6, each slit 144 has a cross section in a plane perpendicular to the axis of elongation, wherein the cross section has a shape with two opposing sides that taper from the upper surface of the carrier plate to the lower surface of the carrier plate. The limited available space between neighboring lens elements 142 precludes the provision of a stepped surface profile in the two opposing tapering sides, and it also restricts the enclosed angle of the two opposing tapering sides to about 20 degrees.

In FIGS. 4b to 4d, the slits 144 taper from the upper surface 141a to the lower surface 141b. In FIG. 6, the slits 144 taper from the lower surface to the upper surface. The preferred taper direction may depend on parameters such as the shape of the lens elements 142, the required light distribution and the light source (e.g. LED package) used.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. In a device claim enumerating several means, two or more of these means may be embodied by one and the same item of hardware. The mere fact that certain measures are recited in mutually different dependent claims does not indicate that a combination of these measures cannot be used to advantage.

The various aspects discussed in this patent can be combined in order to provide additional advantages. Further, the person skilled in the art will understand that embodiments can be combined, and that also more than two embodiments can be combined.

The invention claimed is:

1. An optical component for a luminaire, the optical component comprising a carrier plate having an upper surface and a lower surface, and a plurality of lens elements provided on the upper surface, each two neighboring lens elements having an intermediate region,
    wherein, in each intermediate region, the carrier plate comprises a slit, the slit having an elongated shape with an axis of elongation parallel to a plane of the carrier plate,
    wherein each slit has a cross section in a plane perpendicular to the axis of elongation, the cross section having a shape with two opposing tapering sides, and
    wherein each of the two opposing tapering sides has a stepped surface profile.

2. The optical component according to claim 1, wherein each slit fully extends through the carrier plate, from the upper surface to the lower surface.

3. The optical component according to claim 1, wherein the two opposing tapering sides have an enclosed angle of at least 60 degrees.

4. The optical component according to claim 1, wherein the optical component further comprises a plurality of louvers, each louver being provided in a slit.

5. The optical component according to claim 4, wherein the louvers are interconnected to form a louver grid.

6. The optical component according to claim 1, wherein, for each two neighboring lens elements, the intermediate region has a first width, and the slit has a second width, each of the first width and the second width being measured in a direction connecting the centers of the two neighboring lens elements, and wherein the second width is larger than the first width so that the slit cuts a part of each of the two neighboring lens elements.

7. A luminaire comprising:
    a light engine having a board with a plurality of light sources, and
    an optical component according to claim 1,
    wherein the optical component is arranged to receive light that is emitted by the light engine.

8. The luminaire according to claim 7, wherein the light engine and the optical component are provided in a housing, wherein the housing has a light exit window, and wherein the luminaire further has a light transmissive cover that is arranged at the light exit window.

9. The luminaire according to claim 8, wherein the light transmissive cover is a diffusive cover.

10. The luminaire according to claim 7, wherein the optical component is attached to the light engine by means of a click connection.

* * * * *